(12) United States Patent
Suzuki

(10) Patent No.: US 8,896,615 B2
(45) Date of Patent: Nov. 25, 2014

(54) IMAGE PROCESSING DEVICE, PROJECTOR, AND IMAGE PROCESSING METHOD

(75) Inventor: Naoki Suzuki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 835 days.

(21) Appl. No.: 13/032,927

(22) Filed: Feb. 23, 2011

(65) Prior Publication Data

US 2011/0210967 A1   Sep. 1, 2011

(30) Foreign Application Priority Data

Mar. 1, 2010   (JP) ................................. 2010-043864

(51) Int. Cl.
G09G 5/36       (2006.01)
H04N 13/00      (2006.01)
H04N 13/04      (2006.01)
H04N 9/31       (2006.01)

(52) U.S. Cl.
CPC ......... *H04N 9/3197* (2013.01); *H04N 13/0029* (2013.01); *H04N 13/0438* (2013.01); *H04N 9/3188* (2013.01); *H04N 13/0459* (2013.01)
USPC ........................................................ 345/560

(58) Field of Classification Search
CPC ................ G09G 340/0414; G09G 2340/0421; G09G 2340/0407
USPC ........................................................ 345/560
See application file for complete search history.

(56) References Cited

U.S. PATENT DOCUMENTS

| 6,553,184 | B1* | 4/2003 | Ando et al. ................... 386/232 |
| 6,667,773 | B1* | 12/2003 | Han, II ........................ 348/441 |
| 6,961,479 | B1* | 11/2005 | Takarada ..................... 382/300 |
| 2006/0044388 | A1* | 3/2006 | Kim et al. ........................ 348/42 |
| 2009/0016619 | A1* | 1/2009 | Todoroki ..................... 382/233 |
| 2011/0134219 | A1 | 6/2011 | Kim et al. |

FOREIGN PATENT DOCUMENTS

| JP | A-2001-36812 | 2/2001 |
| JP | A-2001-75047 | 3/2001 |
| JP | A-2005-266116 | 9/2005 |
| JP | A-2006-67596 | 3/2006 |
| JP | A-2009-152897 | 7/2009 |
| JP | A-2010-34704 | 2/2010 |

* cited by examiner

*Primary Examiner* — Hau Nguyen
(74) *Attorney, Agent, or Firm* — Oliff PLC

(57) ABSTRACT

An image processing device includes: a horizontal resolution converting unit that converts a horizontal resolution of input image data to output horizontal resolution-converted image data; a line memory for the left eye and a line memory for the right eye that store the horizontal resolution-converted image data; a line memory specifying unit that specifies the line memory to store the horizontal resolution-converted image data; a line memory reading unit that reads the horizontal resolution-converted image data from either of the line memory for the left eye and the line memory for the right eye; and a vertical resolution converting unit that converts a vertical resolution of the horizontal resolution-converted image data read by the line memory reading unit to generate output image data.

19 Claims, 6 Drawing Sheets

IMAGE PROCESSING DEVICE, PROJECTOR, AND IMAGE PROCESSING METHOD

The entire disclosure of Japanese Patent Application No. 2010-043864, filed Mar. 1, 2010 is expressly incorporated by reference herein.

BACKGROUND

1. Technical Field

The present invention relates to an image processing device that processes input image data in which image data derived from a plurality of different images is arranged line by line, a projector, and an image processing method.

2. Related Art

As a technique for representing three-dimensional stereoscopic videos in the related art, a technique referred to as a time-sharing method has been proposed in which a display that alternately displays an image for the left eye and an image for the right eye every frame period is combined with shutter glasses that alternately open and close the left-eye shutter and the right-eye shutter in synchronization with a frame to display a stereoscopic video for a user (JP-A-2009-152897). In addition to the time-sharing method, various kinds of methods using stereoscopic glasses, such as an anaglyph method or a polarizing filter method, have been proposed.

As a method of realizing stereoscopic vision with the naked eyes without using glasses, a parallax barrier method and the like have been known (JP-A-2005-266116).

Various studies have been made also on a format of video signals for stereoscopic vision and the transmitting method of the signals. Recently, HDMI (registered trademark) (High-Definition Multimedia Interface) as an interface for so-called digital appliances has been adapted to the transmission of stereoscopic videos, so that it is expected that the market of stereoscopic videos will increase in the future.

As a format of stereoscopic videos, a method of interlacing an image for the left eye and an image for the right eye in units of scanning lines has been proposed. However, JP-A-2009-152897 and JP-A-2005-266116 do not make a study to efficiently resize interlaced stereoscopic video signals. JP-A-2001-075047 discloses an example of rearranging images line by line for interlaced video signals to reconstruct an image for the left eye and an image for the right eye. In such a configuration, however, an increase in memory or circuit scale required to resize an image represented by interlaced video signals is a problem.

SUMMARY

An advantage of some aspects of the invention is to solve the problem described above, and the invention can be realized as the following modes or application examples.

An application example is directed to an image processing device that processes input image data, including: a horizontal resolution converting unit that converts a horizontal resolution of the input image data to output horizontal resolution-converted image data; a first line memory that store the horizontal resolution-converted image data line by line; a second line memory that store the horizontal resolution-converted image data line by line; a line memory specifying unit that specifies whether the horizontal resolution-converted image data is stored in the first line memory or in the second line memory; a line memory reading unit that reads the horizontal resolution-converted image data from either of the first line memory and the second line memory; and a vertical resolution converting unit that converts a vertical resolution of the horizontal resolution-converted image data read by the line memory reading unit to generate output image data.

The image processing device according to the application example stores the input image data in the specified line memory while performing a horizontal resolution conversion, and performs a vertical resolution conversion based on the image data stored in the line memory. In short, on input image data composed of image data derived from images different from line to line, like image data for stereoscopic vision, a resolution conversion and switching between output destinations of horizontal resolution-converted image data are continuously performed. That is, different images are alternately read from the line memories, so that the resolution conversion can be performed while rearranging data. Therefore, it is possible to reduce the circuit scale to thereby reduce the device cost. The sum of the capacity of the first line memory and the capacity of the second line memory does not necessarily reach a capacity required to store image data corresponding to one frame of the input image data. Accordingly, compared to a case of rearranging image data using a frame memory, the image processing device can be configured with a memory having a smaller capacity, thereby making it possible to provide an image processing device at lower cost.

According to the application example, since horizontal resolution-converted image data that is continuous in the vertical direction is stored in each of the line memories, the horizontal resolution-converted image data can be read continuously, making it possible to immediately convert the vertical resolution. In short, when a plurality pieces of image data are an image for the right eye and an image for the left eye, the horizontal resolution-converted image data is stored properly in a line memory for the right eye and a line memory for the left eye based on the result of determining the image data line by line. Therefore, the configuration of a reading side can be simplified compared to read the image data while interlacing the lines, and further, the efficiency of reading the image data from the line memory can be enhanced.

According to the application example, since the output destination of the horizontal resolution-converted image data is determined based on a line number of the input image data, the line memory specifying unit can be configured simply.

According to the application example, the vertical resolution conversion can be started without waiting for input image data corresponding to one frame to be fully established. That is, the delay from when the first line of the input image data is input to when the resolution-converted image data is output can be minimized.

According to the application example, image data is read from one of the line memories, in which horizontal resolution-converted image data corresponding to the required number of lines to convert the vertical resolution has been recorded, while the horizontal resolution-converted image is written to the other line memory, so that the processing can be performed efficiently. For example, in a case of processing input image data for stereoscopic vision, image data is read from a line memory for the left eye when an image for the left eye is ready for a vertical resolution conversion, while a horizontal resolution-converted image is written to a line memory for the right eye. Therefore, the processing can be performed efficiently. Without preventing read access to one of the line memories, write access to the other line memory is available.

According to the application example, an output method when outputting the resolution-converted output image data to an image display apparatus can be selected. Specifically, for example, when input image data is image data for stereoscopic vision, it is possible to interlace image data for the left eye and image data for the right eye line by line in output image data to output the output image data, or to generate output image data, in which the latter half of each line is composed of image data for the right eye, to output the output image data. Moreover, an output port of a frame buffer in which only image data for the left eye is temporarily stored and an output port of a frame memory in which only image data for the right eye is temporarily stored can be opened independently. Accordingly, a combination with various image display apparatuses different in input format is possible, which can enhance the versatility.

According to the application example, when a horizontal resolution conversion is performed on an end of input image data, a value unrelated to the input image data is not referenced. Therefore, the distortion at an end of a horizontal resolution-converted image can be reduced.

According to the application example, in a case where input image data in a so-called side-by-side format, which includes image data for the left eye and image data for the right eye on one scanning line, is given, when performing a horizontal resolution conversion on a right end of the image data for the left eye, the image data for the right eye is not referenced. Therefore, the distortion at an end of a horizontal resolution-converted image for the left eye can be reduced. Moreover, when performing a horizontal resolution conversion on a left end of the image data for the right eye, the image data for the left eye is not referenced. Therefore, the distortion at an end of a horizontal resolution-converted image for the right eye can be reduced.

The invention can be realized in various modes such as an image display apparatus or projector including the image processing device configured as described above, an image displaying method in an image processing device, a computer program for causing the image processing device configured as described above to execute the displaying method, or a recording medium in which the computer program is recorded. Any of the modes can provide the advantageous effects described above.

Another application example is directed to a projector including: the image processing device according to any of the application examples; and a projection optical device that projects an image based on the output image data output from the image processing device. Accordingly, the projector according to the application example has the advantageous effects provided by the image processing device according to the application example.

Still another application example is directed to an image processing method in an image processing device including a first line memory and a second line memory, including: converting a horizontal resolution of input image data to output horizontal resolution-converted image data; storing the horizontal resolution-converted image data in the first line memory or the second line memory; specifying whether the horizontal resolution-converted image data is stored in the first line memory or in the second line memory; reading the horizontal resolution-converted image data from either of the first line memory and the second line memory; and converting a vertical resolution of the horizontal resolution-converted image data read by the line memory reading unit to generate output image data. Accordingly, an electronic apparatus configured to be able to execute the image processing method according to the application example has the advantageous effects provided by the image processing device according to the application example.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments to which the invention is applied will be described with reference to the drawings.

Figure 1:
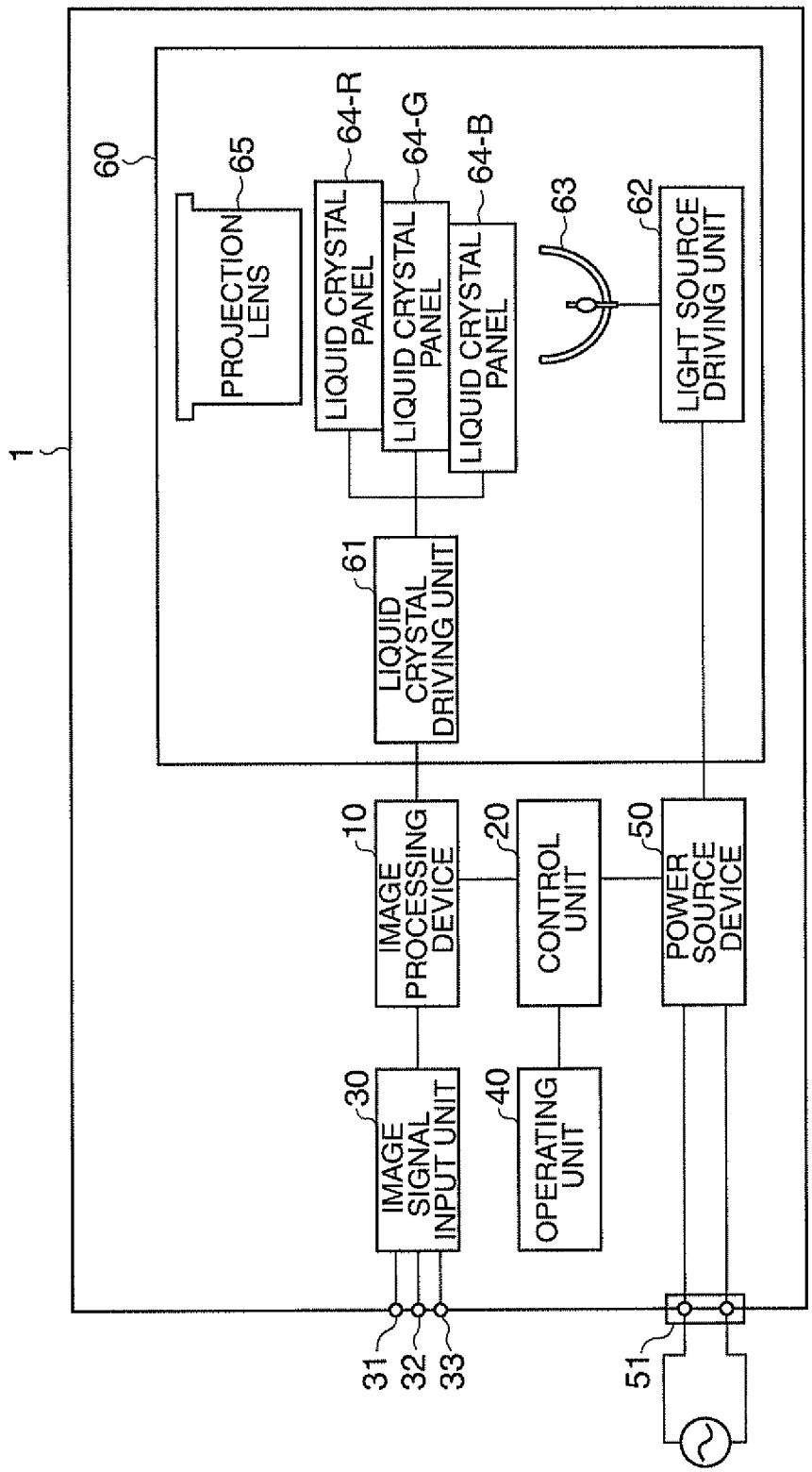
FIG. 1 is a block diagram illustrating the configuration of a projector according to a first embodiment.

FIG. 1 is a block diagram showing a circuit configuration of a projector according to the embodiment. As shown in FIG. 1, the projector 1 includes an image processing device 10, a control unit 20, an image signal input unit 30, input terminals 31, 32, and 33, an operating unit 40, a power source device 50, a power source connector 51, and an image projecting unit 60. The constituent elements are contained inside a casing (not illustrated) of the projector 1. The power source device 50 converts a power source supplied through the power source connector 51 into a direct current at a given voltage to distribute the current to each part. The image signal input unit 30, which is connected to the plurality of input terminals 31, 32, and 33, can receive various kinds of video signals such as HDMI (High-Definition Multimedia Interface) signals, composite video signals, or RGB signals. The control unit 20 controls the image signal input unit 30 so that a source is switched to the input terminal 31, 32, or 33 selected by a user of the projector 1 through the operating unit 40. The image signal input unit 30 converts video signals from the input terminal 31, 32, or 33 selected as a source into a format acceptable by the image processing device 10 and outputs the video signals thereto.

The image projecting unit 60 includes a liquid crystal driving unit 61, a light source driving unit 62, a lamp 63, a liquid crystal panel 64 (64-R, 64-G, and 64-B), and a projection lens 65. The liquid crystal driving unit 61 drives the liquid crystal panel 64 as a light modulator based on output image data from the image processing device 10. Light emitted from the lamp 63 is modulated by the liquid crystal panel 64 and projected as image light from the projection lens 65.

Figure 2:
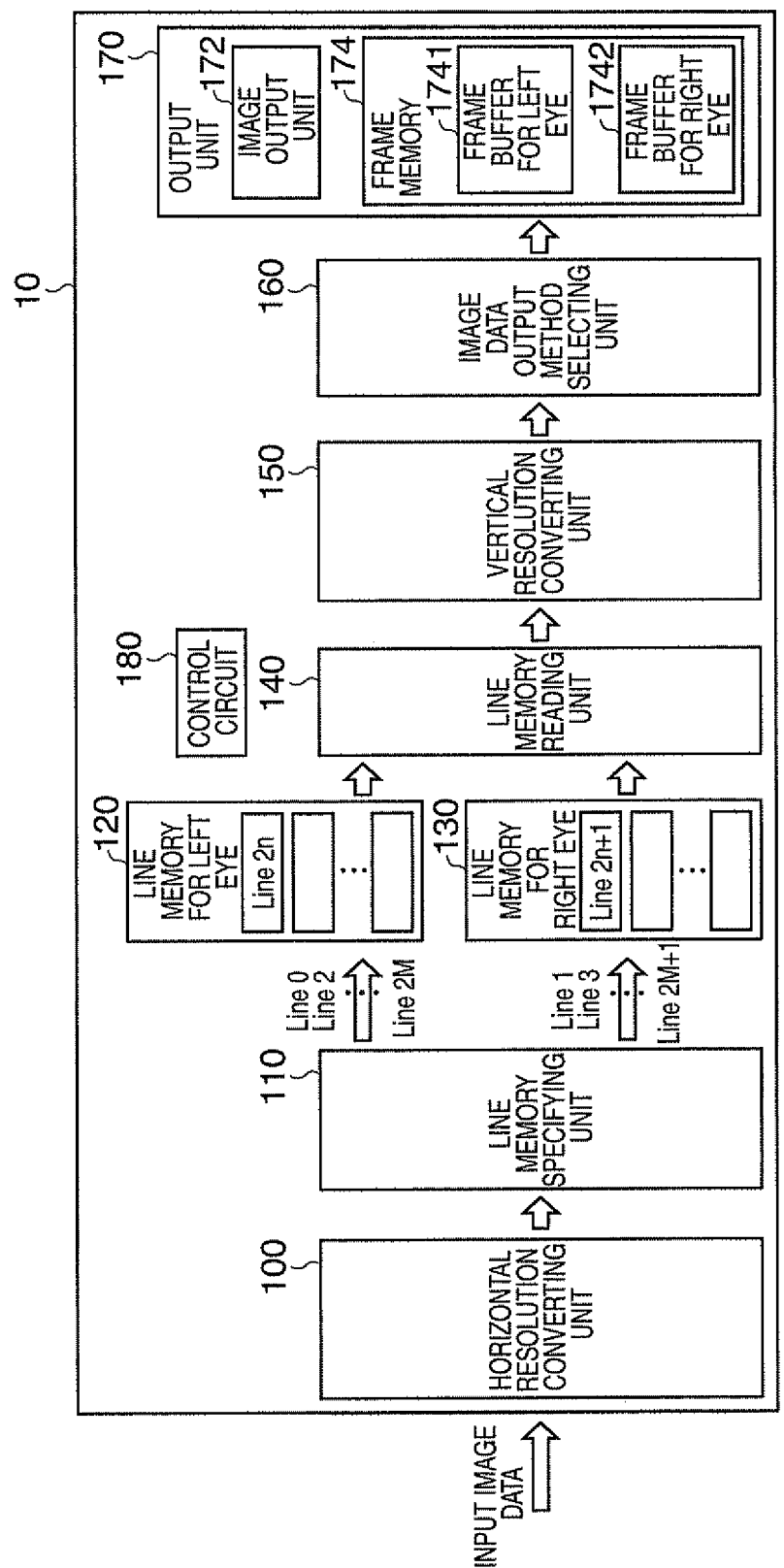
FIG. 2 is a block diagram illustrating the configuration of an image processing device according to the first embodiment.

FIG. 2 is a block diagram showing the schematic configuration of the image processing device 10 according to the embodiment. The image processing device 10 has a horizontal resolution converting unit 100, a line memory specifying unit 110, a line memory 120 for the left eye, a line memory 130 for the right eye, a line memory reading unit 140, a vertical resolution converting unit 150, an image data output method selecting unit 160, an output unit 170, and a control circuit 180. The control circuit 180 is connected with the control unit 20 to control the image processing device 10 according to control signals generated by the control unit 20 based on operation received by the operating unit 40. The line memory 120 for the left eye and the line memory 130 for the right eye each have a capacity that can store the required amount of data to perform a vertical resolution conversion in the vertical resolution converting unit 150, that is, the required number of lines.

Figure 3:
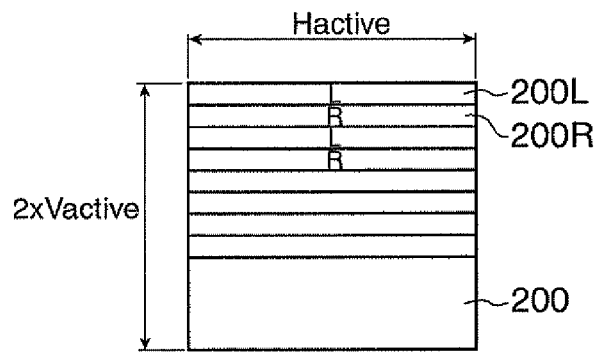
FIG. 3 is a diagram showing an input image in which an image for the left eye and an image for the right eye are alternately arranged line by line.

The horizontal resolution of input image data input from the image signal input unit 30 is first converted by the horizontal resolution converting unit 100. The horizontal resolution converting unit 100 performs a resolution conversion in the horizontal direction on input image data 200 composed of an image in which input image data 200L for the left eye and input image data 200R for the right eye are alternately arranged line by line as shown in FIG. 3. When the cycle of a vertical synchronizing signal of common image data not corresponding to stereoscopic vision is defined as Vactive, the cycle of a vertical synchronizing signal of the input image data 200 is 2×Vactive. The resolution conversion method used herein may include one using filtering or an edge adaptation.

Figures 4A, 4B:
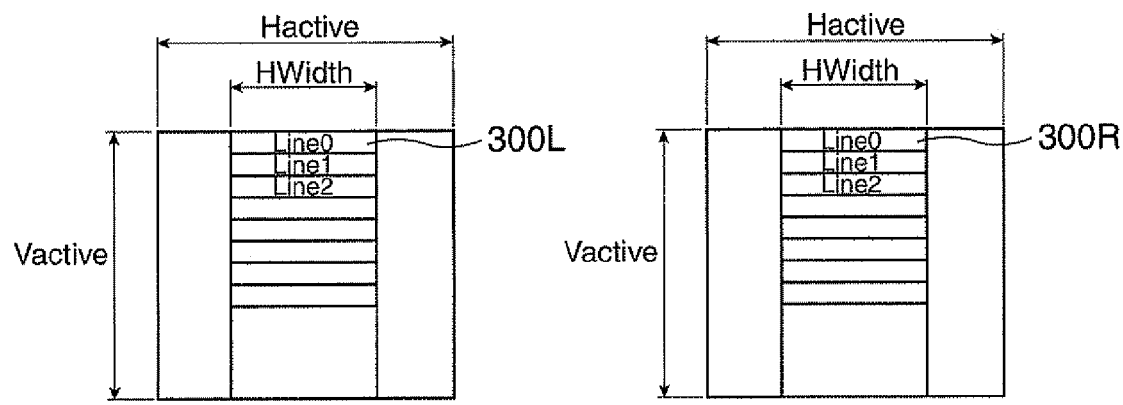
FIGS. 4A and 4B are diagrams showing an image after performing a horizontal resolution conversion.

FIGS. 4A and 4B are schematic diagrams as a result of converting a horizontal resolution of the input image data 200 shown in FIG. 3 by the horizontal resolution converting unit 100. FIG. 4A illustrates horizontal resolution-converted image data 300L for the left eye, while FIG. 4B illustrates horizontal resolution-converted image data 300R for the right eye.

The line memory specifying unit 110 specifies, based on a line number of horizontal resolution-converted image data 300 input to the line memory specifying unit 110, whether image data of the corresponding line number is stored in the line memory 120 for the left eye as the horizontal resolution-converted image data 300L for the left eye or stored in the line memory 130 for the right eye as the horizontal resolution-converted image data 300R for the right eye. Even across frames, if the 0th line of a frame is for the horizontal resolution-converted image data 300L for the left eye, the line memory specifying unit 110 determines the odd-numbered lines as the lines for the horizontal resolution-converted image data 300L for the left eye and determines the even-numbered lines as the lines for the horizontal resolution-converted image data 300R for the right eye. If the 0th line of the next frame is for the right eye, the line memory specifying unit 110 determines the odd-numbered lines as the lines for the horizontal resolution-converted image data 300R for the right eye and determines the even-numbered lines as the lines for the horizontal resolution-converted image data 300L for the left eye. Whether each of the odd-numbered line and the even-numbered line is used as for the left eye or for the right eye can be determined based on the specification of the input image data 200.

The line numbers of the horizontal resolution-converted image data 300 written to the line memory 120 for the left eye and the line memory 130 for the right eye can be expressed as follows. For example, when the even-numbered lines of each frame are images for the left eye and the odd-numbered lines are images for the right eye, the line number of image data written to the line memory 120 for the left eye can be expressed as 2n, and the line number of image data written to the line memory 130 for the right eye can be expressed as 2n+1.

When the 0th line of each frame is switched frame by frame between that for the left eye and that for the right eye, the line memory may be switched frame by frame between that to which the even-numbered lines are written and that to which the odd-numbered lines are written.

The determination method is not limited to the method based on the line number of the input image data 200. For example, the determination may be made based on information on the brightness difference in the horizontal direction of the horizontal resolution-converted image data 300. In this case, based on information on the brightness difference in the horizontal direction that can be obtained by differentiating the input image data 200 or the horizontal resolution-converted image data 300 line by line, a determination may be made on whether the horizontal resolution-converted image data 300 is the horizontal resolution-converted image data 300L for the left eye or the horizontal resolution-converted image data 300R for the right eye. This determination may be made by the line memory specifying unit 110 or by the horizontal resolution converting unit 100. When the determination is made by the horizontal resolution converting unit 100, the result of line-by-line determination is input to the line memory specifying unit 110.

The line memory reading unit 140 selects one of the line memory 120 for the left eye and the line memory 130 for the right eye, to which image data corresponding to the required number of lines to convert the vertical resolution in the vertical resolution converting unit 150 is written, to read the image data and sends the data to the vertical resolution converting unit 150.

In this case, during writing of the horizontal resolution-converted image data 300R for the right eye to the line memory 130 for the right eye, image data required for the vertical resolution conversion for the left eye is read from the line memory 120 for the left eye. During writing of the horizontal resolution-converted image data 300L for the left eye to the line memory 120 for the left eye, image data required for the vertical resolution conversion for the right eye is read from the line memory 130 for the right eye. By doing this, the image processing can be performed efficiently.

The vertical resolution converting unit 150 converts a vertical resolution of image data input from the line memory reading unit 140. Image data output from the vertical resolution converting unit 150 is output from the output unit 170 by an output method selected in advance.

The output unit 170 includes an image output unit 172 and a frame memory 174. The control circuit 180 controls the image data output method selecting unit 160 based on the output method set in advance. The image data output method selecting unit 160 selects, according to an instruction from the control circuit 180, whether resolution-converted image data is output from the image output unit 172 or output to the frame memory 174. Further, output image data can be output by various kinds of output methods. For example, image data for the left eye and image data for the right eye can be output in an interlace format, or they can be output in a so-called side-by-side format in which image data for the left eye and image data for the right eye are included on one line of output image data. Moreover, after outputting output image data for the left eye corresponding to one frame, output image data for the right eye corresponding to one frame can be output.

The frame memory 174 stores image data whose vertical resolution has been converted and has a capacity that can be allocated to at least a frame buffer 1741 for the left eye and a frame buffer 1742 for the right eye.

Image Processing Method of Image Processing Device

Figure 5:
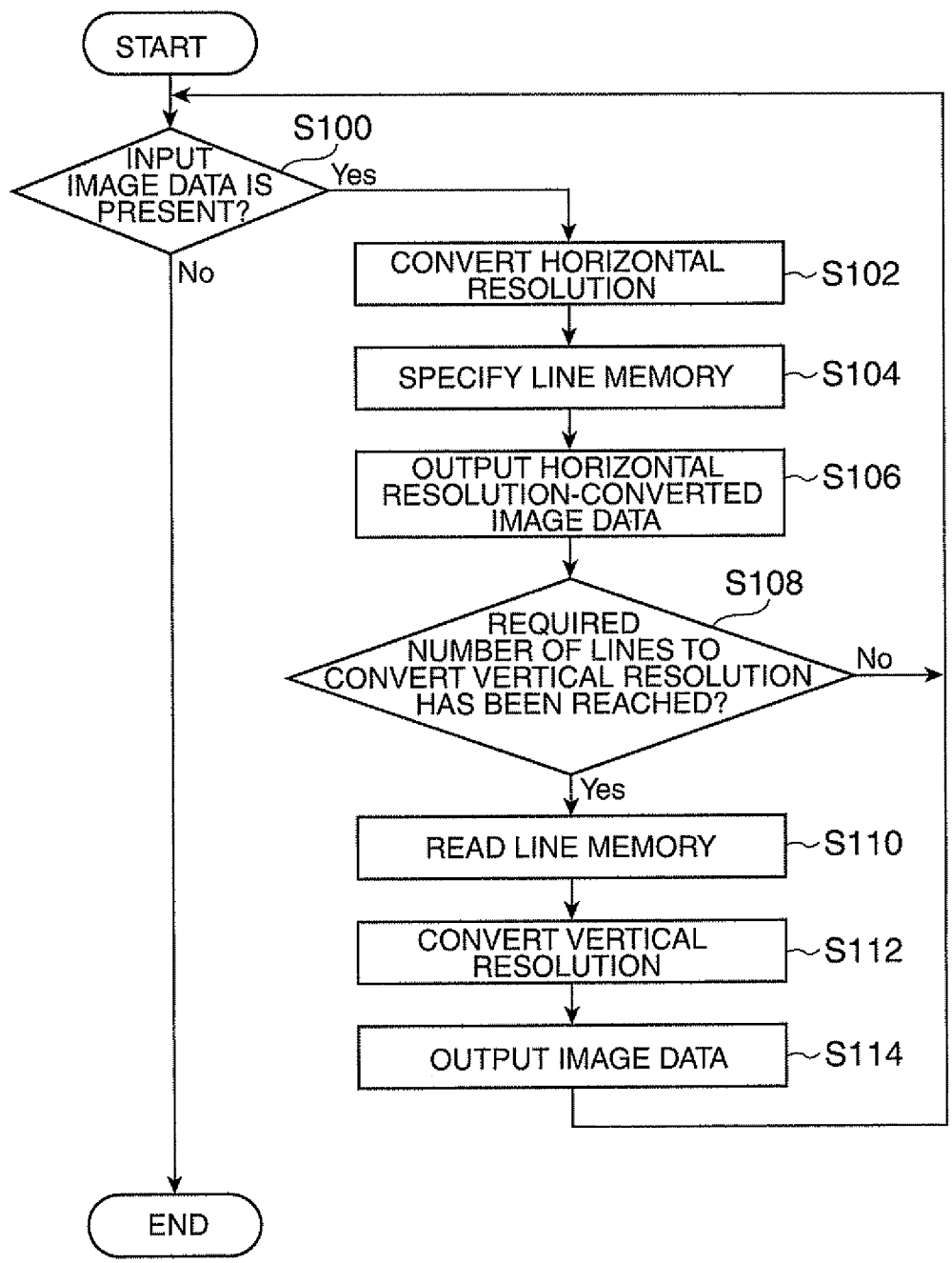
FIG. 5 is a flowchart of an image processing method in the image processing device according to the first embodiment.

An image processing method in the image processing device 10 of the embodiment will be described with reference to FIG. 5.

The image processing device 10 determines whether or not input image data has been input from the image signal input unit 30 (Step S100). If it is determined that input image data has been input (Step S100: Yes), the image processing device 10 performs a horizontal resolution conversion on the input image data 200 in the horizontal resolution converting unit 100 and outputs the horizontal resolution-converted image data 300 (300L and 300R) (Step S102).

Subsequently, the line memory specifying unit 110 specifies whether the horizontal resolution-converted image data 300 is stored in the line memory 120 for the left eye or in the line memory 130 for the right eye (Step S104). The horizontal resolution-converted image data 300 is recorded in the line memory specified by the line memory specifying unit 110 (Step S106).

The line memory specifying unit 110 counts the number of lines recorded in each of the line memories to determine whether or not the required number of lines to convert the vertical resolution has been reached (Step S108). This determination is made on each of the line memory 120 for the left eye and the line memory 130 for the right eye.

If it is determined that the number of lines of the horizontal resolution-converted image data 300 recorded in the line memory has not reached the required number of lines to convert the vertical resolution (Step S108: No), the image processing device returns to Step S100. If it is determined that the number of lines of the horizontal resolution-converted image data 300 recorded in the line memory has reached the required number of lines to convert the vertical resolution, the address of the corresponding line memory is notified to the line memory reading unit 140 (Step S108: Yes). The line memory reading unit 140 reads the horizontal resolution-converted image data 300 from the notified address to input the data to the vertical resolution converting unit 150 (Step S110). The vertical resolution converting unit 150 uses the input horizontal resolution-converted image data 300 to convert the vertical resolution at a given rate, and generate output image data (Step S112). The output image data whose vertical resolution has been converted by the vertical resolution converting unit 150 is output to the output unit 170 according to an output method determined in advance (Step S114).

As has been described above, according to the image processing device 10 of the embodiment, the following advantageous effects can be obtained.

That is, while performing a horizontal resolution conversion on the input image data 200 composed of image data derived from images different from line to line by the horizontal resolution converting unit 100, switching between the line memories (120 and 130) as the output destinations of the horizontal resolution-converted image data is continuously performed. Then, image data is sequentially read from one of the line memories, in which the storing of horizontal resolution-converted image data corresponding to the required number of lines to convert a vertical resolution has been completed, and a vertical resolution conversion is performed by the vertical resolution converting unit 150. That is, by continuously performing the resolution conversion and the rearrangement of image data, the circuit scale is reduced, and therefore, an advantageous effect of reducing the device cost can be obtained.

Second Embodiment

Figure 6:
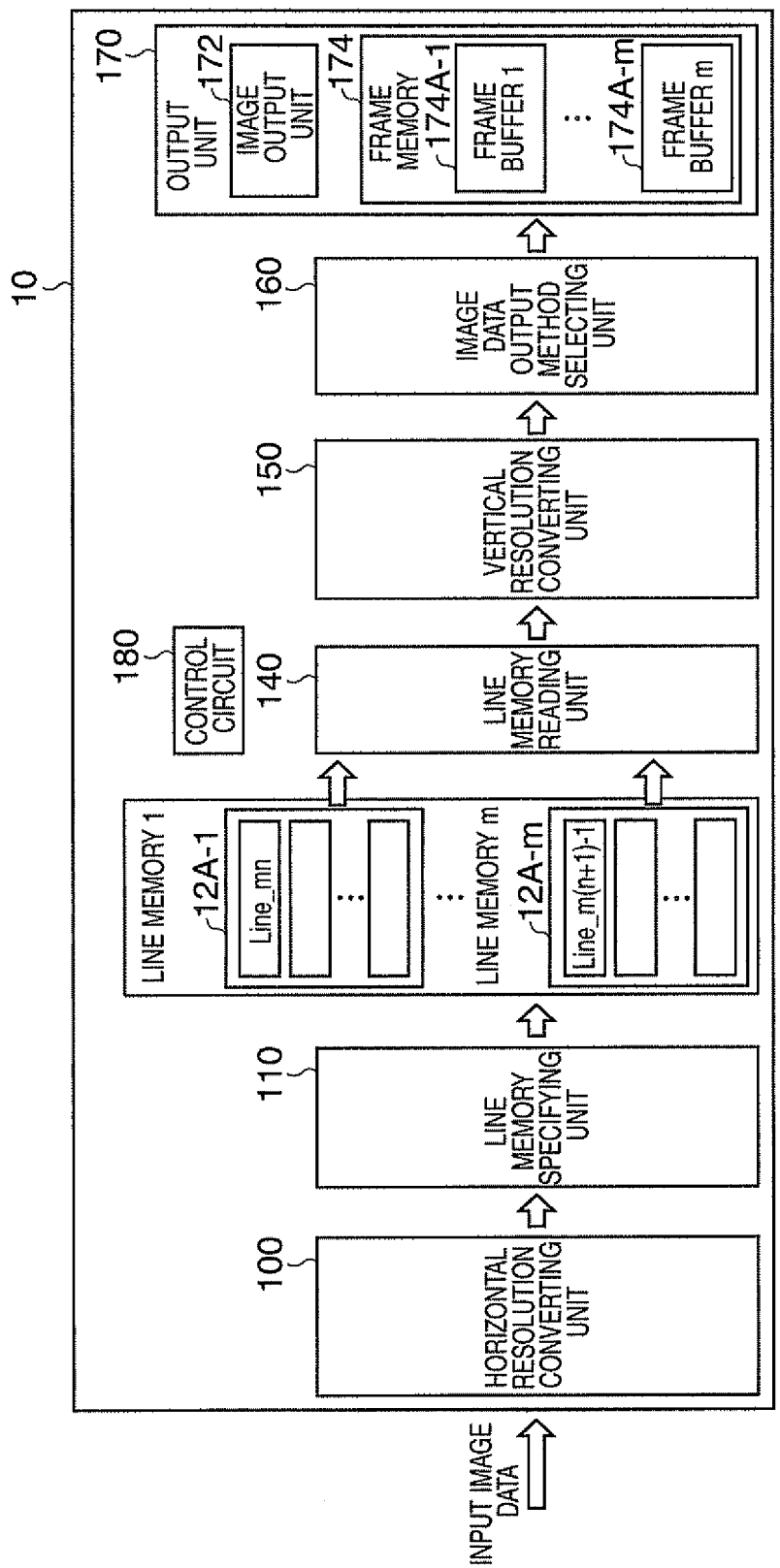
FIG. 6 is a block diagram illustrating the configuration of an image processing device according to a second embodiment.
Figures 7A, 7B:
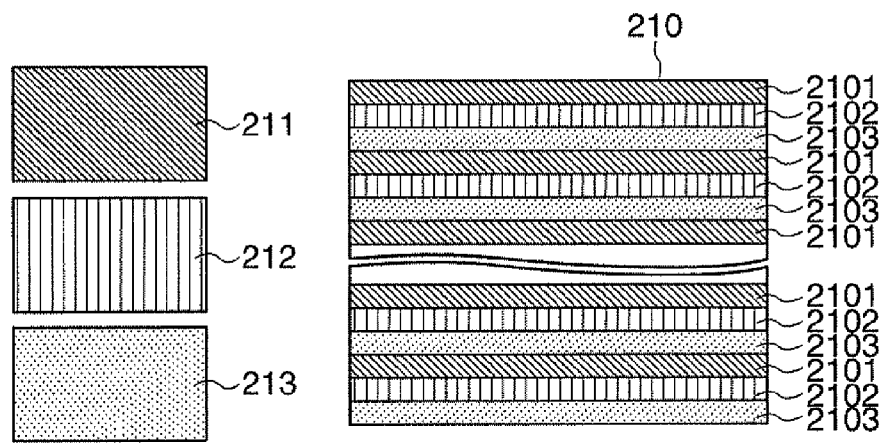
FIGS. 7A and 7B are diagrams showing an input image in which a plurality of different images are arranged line by line.

In the first embodiment, the image in which the input image data 200L for the left eye and the input image data 200R for the right eye are alternately arranged line by line has been described for simple description. However, the invention is not limited to the embodiment. For example, when image data 2101, 2102, and 2103 corresponding to a plurality of different images 211, 212, and 213, respectively, shown in FIG. 7A are arranged so as to be interlaced line by line, that is, when data such as input image data 210 shown in FIG. 7B is processed, line memories 12A-1 to 12A-m (m is an integer of 2 or more) are provided, and m pieces of frame buffers 174A-1 to 174A-m (m is an integer of 2 or more) are provided in the frame memory 174, as shown in FIG. 6. Therefore, processing similar to that of the first embodiment is possible.

Modified Example

In the embodiments, the input image data in which a plurality pieces of image data are arranged line by line has been described. However, the invention is also effective for input image data 220 including a plurality of images on one line as shown in FIG. 8.

Figure 8:
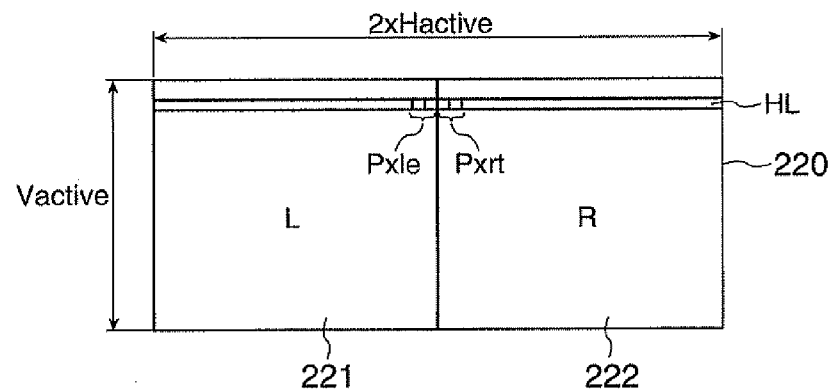
FIG. 8 is a diagram showing an input image in which a plurality of different images are arranged on one line.

The first half of a horizontal scanning line (line) HL of the input image data 220 shown in FIG. 8, that is, the left half of a frame is composed of input image data 221 for the left eye, and the second half of the horizontal scanning line HL, that is, the right half of the frame is composed of input image data 222 for the right eye. When the cycle of a horizontal synchronizing signal of common image data not corresponding to stereoscopic vision is defined as Hactive, the cycle of a horizontal synchronizing signal of the input image data 220 is 2×Hactive.

In a case of processing the input image data 220, when a resolution conversion is performed on the vicinity of the right end of the input image data 221 for the left eye in the horizontal resolution converting unit 100, referencing the input image data 222 for the right eye immediately subsequent to the right end affects the image quality in the vicinity of the right end of output image data output from the image processing device 10, which is not preferable. This problem can be solved by performing a resolution conversion using a pixel row obtained by horizontally folding pixels in the vicinity of the right end of the input image data 221 for the left eye. In addition, such a control can be easily realized by referencing the value of a counter that counts the number of pixels of input image data.

Pxle shown in FIG. 8 represents a pixel row on the right end side of the image data 221 for the left eye, while Pxrt represents a pixel row on the left end side of the image data 222 for the right eye.

Figure 9:
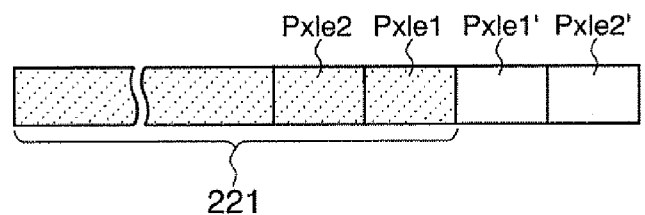
FIG. 9 is a diagram showing a state where copied pixels are coupled to an end of a line.

Here, the horizontal resolution conversion processing of the image data 220 will be described with reference to FIG. 9. Pxle1 represents a pixel located at the rightmost position in a certain scanning line constituting the image data 221 for the left eye. Pxle2 represents a pixel located to the left of Pxle1. In this example, it is assumed that the horizontal resolution converting unit 100 copies two pixels located at the right end of the image data 221 for the left eye to couple the pixels with the right end of the image for the left eye. The horizontal resolution converting unit 100 copies Pxle1 to generate Pxle1' and couples Pxle1' to the right of Pxle1. Further, the horizontal resolution converting unit 100 copies Pxle2 to generate Pxle2' and couples Pxle2' to the right of Pxle1'. In this manner, expanded image data in which the right end side of the original image data 221 for the left eye is expanded by two pixels is generated. The horizontal resolution of the right end of the image data 221 for the left eye is converted using the expanded image data, whereby the converted result with less distortion can be obtained compared to a case of referencing the pixel on the left end side of the image data 222 for the right eye. Only by changing a pixel to be copied and the location where the copied pixel is coupled, expanded image data in which the left end side of the image data 222 for the right eye is expanded by two pixels can be generated. It is also, of course, possible to expand the left end side of the image data 221 for the left eye and the right end side of the image data for the right eye by the same method. Moreover, the generation of expanded image data described above is also applicable to any of the embodiments described above.

The horizontal resolution converting unit 100 may generate a nonexistent pixel to the right of the right end of the image data for the left eye and perform a resolution conversion on the vicinity of the right end of the image data for the left eye with reference to the nonexistent pixel. For the generation of the nonexistent pixel, various kinds of known techniques are applicable. It is possible to appropriately determine how many nonexistent pixels are generated according to the image quality required for output image data and the conversion rate of the resolution.

In the embodiments, the example of processing input image data in which image data based on a plurality of different images is arranged line by line has been described. In the modified example, the case where a plurality of images are included on one line has been described. However, input image data may be composed of image data based on a single image. Moreover, the invention can handle input image data including plurality of images and information on the images in one frame. The information on the image in this case can include, for example, parameters for expressing the depth of the image.

Although the output method can be selected in the embodiments, the address to which output image data is written may further be switched according to the selected output method.

Although the embodiment of the projector 1 that projects stereoscopic images has been illustrated, the invention is not limited thereto. For example, when input image data is in the format corresponding to stereoscopic vision, an image projected by the projector 1 may be switched between the stereoscopic 3D system and the normal 2D system. A user of the projector 1 can select, while viewing a menu screen projected from the image projecting unit 60, either of the systems to project an image by operating the operating unit 40. The operating unit 40 may be an operation panel provided for the casing of the projector 1 or may be a not-shown remote controller. Moreover, the invention may be configured to be able to select whether an image is projected by the 3D system or the 2D system through remote control from a terminal device that can be networked with the projector 1, regardless of wired or wireless connection.

Although the image processing device 10 has been described in conjunction with the projector 1 that adopts the liquid crystal panel 64 as a light modulator in the embodiment, the invention can be implemented in other modes. For example, the image processing device 10 can be applied to a projector that adopts a digital micromirror device or a reflective liquid crystal panel as a light modulator. Moreover, the image processing device 10 can be applied to an image display apparatus including a direct-view-type flat-panel display such as a plasma display or an organic EL (Electro Luminescence) display.

What is claimed is:

1. An image processing device that processes input image data including input image data for a left eye and input image data for a right eye, the image processing device, comprising:
   a horizontal resolution converting unit that (i) converts a horizontal resolution of the input image data for the left eye to output horizontal resolution-converted image data for the left eye, and (ii) converts a horizontal resolution of the input image data for the right eye to output horizontal resolution-converted image data for the right eye;
   a line memory specifying unit that specifies whether the horizontal resolution-converted image data is stored in a first line memory or in a second line memory;
   the first line memory configured to store the horizontal resolution-converted image data for the left eye;
   the second line memory configured to store the horizontal resolution-converted image data for the right eye;
   a line memory reading unit that reads the horizontal resolution-converted image data from either of the first line memory and the second line memory; and
   a vertical resolution converting unit that converts a vertical resolution of the horizontal resolution-converted image data read by the line memory reading unit to generate output image data.

2. The image processing device according to claim 1, wherein the line memory specifying unit specifies, according to line information based on the input image data, whether the horizontal resolution-converted image data is stored in the first line memory or in the second line memory.

3. The image processing device according to claim 2, wherein the line information includes a line number of the horizontal resolution-converted image data output from the horizontal resolution converting unit.

4. The image processing device according to claim 1, wherein the first line memory and the second line memory each have a capacity that can hold the required number of lines to convert the vertical resolution of the horizontal resolution-converted image data in the vertical resolution converting unit.

5. The image processing device according to claim 4, wherein the line memory reading unit reads the horizontal resolution-converted image data from one of the first line memory and the second line memory, in which the stored horizontal resolution-converted image data has reached the required number of lines.

6. The image processing device according to claim 1, further comprising an image data output method selecting unit for selecting an output method of the output image data.

7. The image processing device according to claim 1, wherein the horizontal resolution converting unit copies one or more pixels from an end of each of scanning lines constituting the input image data to couple the one or more pixels with the end, thereby generating the horizontal resolution-converted image data.

8. The image processing device according to claim 7, wherein when each of the scanning lines is configured to include at least image data for the left eye and image data for the right eye, the horizontal resolution converting unit copies one or more pixels from a right end of the image data for the left eye to couple the one or more pixels with the right end, thereby generating horizontal resolution-converted image data for the left eye, and copies at least one or more pixels from a left end of the image data for the right eye to couple the at least one or more pixels with the left end, thereby generating horizontal resolution-converted image data for the right eye.

9. A projector comprising:
the image processing device according to claim 1; and
a projection optical device that projects an image based on the output image data output from the image processing device.

10. The image processing device according to claim 1, wherein the line memory specifying unit stores the horizontal resolution-converted image data in either the first line memory or in the second line memory responsive to line information indicating an even-numbered line or an odd-numbered line.

11. The image processing device according to claim 1, wherein the line memory specifying unit stores the horizontal resolution-converted image data in either the first line memory or in the second line memory responsive to a brightness difference in the horizontal direction of the horizontal resolution-converted image data.

12. The image processing device according to claim 1, wherein when horizontal resolution-converted image data is being stored in one of the first line memory or the second line memory, the line memory reading unit reads horizontal resolution-converted image data from an other of the first line memory or the second line memory.

13. The image processing device according to claim 1, wherein all of the horizontal resolution-converted image data is stored in the first line memory and the second line memory.

14. An image processing method in an image processing device that processes input image data including input image data for a left eye and input image data for a right eye, the image processing device including a first line memory data for storing horizontal resolution-converted image data for the left eye, and a second line memory for storing horizontal resolution-converted image data for the right eye, the method comprising:
converting a horizontal resolution of input image data for the left eye to output horizontal resolution-converted image data for the left eye, and converting a horizontal resolution of the input image data for the right eye to output horizontal resolution-converted image data for the right eye;
specifying whether the horizontal resolution-converted image data is stored in the first line memory or in the second line memory;
storing the horizontal resolution-converted image data respectively in the first line memory for the left eye or the second line memory for the right eye;
reading the horizontal resolution-converted image data from either of the first line memory and the second line memory; and
converting a vertical resolution of the horizontal resolution-converted image data read by the line memory reading unit to generate output image data.

15. The image processing method according to claim 14, wherein in the simultaneously storing horizontal resolution-converted image data in one of the first line memory or the second line memory, the line memory reading unit reads horizontal resolution-converted image data from an other of the first line memory or the second line memory.

16. The image processing method according to claim 14, wherein in the simultaneously storing the plurality of first lines and a plurality of second lines of the horizontal resolution-converted image data, all of the horizontal resolution-converted image data is stored in the first line memory and the second line memory.

17. An image processing device that processes input image data configured to include a line including image data for a left eye and a line including image data for a right eye, comprising:
a horizontal resolution converting unit that (i) converts a horizontal resolution of the input image data for the left eye to output horizontal resolution-converted image data for the left eye, and (i) converts a horizontal resolution of the input image data for the right eye to output horizontal resolution-converted image data for the right eye;
a line memory specifying unit that specifies, according to line formation based on the input image data, whether the horizontal resolution-converted image data is stored in a first line memory or in a second line memory;
the first line memory configured to store horizontal resolution-converted image data for the left eye;
the second line memory configured to store the horizontal resolution-converted image data for the right eye;
a line memory reading unit that reads the horizontal resolution-converted image data from either of the first line memory and the second line memory; and
a vertical resolution converting unit that converts a vertical resolution of the horizontal resolution-converted image data read by the line memory reading unit to generate output image data.

18. The image processing device according to claim 17, wherein when horizontal resolution-converted image data is being stored in one of the first line memory or the second line memory, the line memory reading unit reads horizontal resolution-converted image data from an other of the first line memory or the second line memory.

19. The image processing device according to claim 17, wherein all of the horizontal resolution-converted image data is stored in the first line memory and the second line memory.

* * * * *